United States Patent
Bergström

(10) Patent No.: US 9,505,193 B2
(45) Date of Patent: *Nov. 29, 2016

(54) STITCHED UNIDIRECTIONAL OR MULTI-AXIAL REINFORCEMENT AND A METHOD OF PRODUCING THE SAME

(71) Applicant: AHLSTROM CORPORATION, Helsinki (FI)

(72) Inventor: Rainer Bergström, Mikkeli (FI)

(73) Assignee: Ahlstrom Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/415,829

(22) PCT Filed: Jul. 15, 2013

(86) PCT No.: PCT/FI2013/050765
§ 371 (c)(1),
(2) Date: Jan. 20, 2015

(87) PCT Pub. No.: WO2014/013138
PCT Pub. Date: Jan. 23, 2014

(65) Prior Publication Data
US 2015/0183184 A1    Jul. 2, 2015

(30) Foreign Application Priority Data

Jul. 20, 2012  (EP) .................... 12177268
May 7, 2013   (FI) .................... 20135470

(51) Int. Cl.
*B29C 70/54* (2006.01)
*B32B 5/06* (2006.01)
(Continued)

(52) U.S. Cl.
CPC .............. *B32B 5/06* (2013.01); *B29C 70/226* (2013.01); *B29C 70/547* (2013.01); *B32B 5/022* (2013.01); *B32B 38/00* (2013.01); *B32B 2305/20* (2013.01)

(58) Field of Classification Search
CPC ............... B29C 70/547; B29C 70/226; B29L 2031/082; B29L 2031/085
USPC ....................................... 428/102
See application file for complete search history.

(56) References Cited

U.S. PATENT DOCUMENTS 3,567,565 A   3/1971   Jones et al.
5,484,642 A   1/1996   Bompard et al.
(Continued)

FOREIGN PATENT DOCUMENTS

CN   1982522     6/2007
CN   102729489   10/2012
(Continued)

OTHER PUBLICATIONS

International Search Report for PCT/FI2013/050765 mailed Oct. 16, 2013, four pages.
(Continued)

*Primary Examiner* — Alexander Thomas
(74) *Attorney, Agent, or Firm* — Nixon & Vanderhye P.C.

(57) ABSTRACT

A stitched unidirectional or multi-axial reinforcement and a method of producing a stitched unidirectional or multi-axial reinforcement includes transversely arranging thin discrete flow passage forming means having a diameter of 70-300 μm in a direction transverse to the direction of the unidirectional rovings at least on the continuous rovings of the at least one layer, and stitching the thin discrete flow passage forming means and the continuous unidirectional rovings to one another to form a reinforcement.

26 Claims, 2 Drawing Sheets

(51) Int. Cl.
*B29C 70/22* (2006.01)
*B32B 5/02* (2006.01)
*B32B 38/00* (2006.01)

(56) References Cited

U.S. PATENT DOCUMENTS

| | | | |
|---|---|---|---|
| 6,482,497 | B1 | 11/2002 | Kay et al. |
| 8,529,717 | B2* | 9/2013 | Hedges et al. ............... 156/83 |
| 2005/0037678 | A1 | 2/2005 | Mack et al. |
| 2005/0070182 | A1* | 3/2005 | Dunn ........................ 442/59 |
| 2007/0193491 | A1 | 8/2007 | Lilleheden et al. |

FOREIGN PATENT DOCUMENTS

| | | |
|---|---|---|
| EP | 14913232 A1 | 12/2004 |
| EP | 1667838BA | 11/2010 |
| JP | 2005-508461 | 3/2005 |
| JP | 2007-45004 | 2/2007 |
| JP | 2010-540786 | 12/2010 |
| JP | 2011-246827 A | 12/2011 |
| JP | 2012-96475 A | 5/2012 |
| WO | 2011/157892 | 12/2011 |

OTHER PUBLICATIONS

Written Opinion for PCT/FI2013/050765 mailed Oct. 16, 2013, four pages.
International Preliminary Report on Patentability for PCT/FI2013/050765, mailed Aug. 4, 2014, six pages.
Office Action in Japanese Patent Application No. 2015-522133 mailed Aug. 5, 2015, with English translation, nine pages.
English translation of the Japanese Supreme Court Decisions Summary cited in Office Action of Japanese Patent Application No. 2015-522133, date of judgment (Jun. 5, 2015), four pages.
First Office Action dated Sep. 14, 2015 issued in Chinese Application No. 201380038708.X with English translation (17 pages).
Office Action dated Dec. 15, 2015 issued in Japanese Application No. 2015-522133 with English translation (7 pages).

* cited by examiner

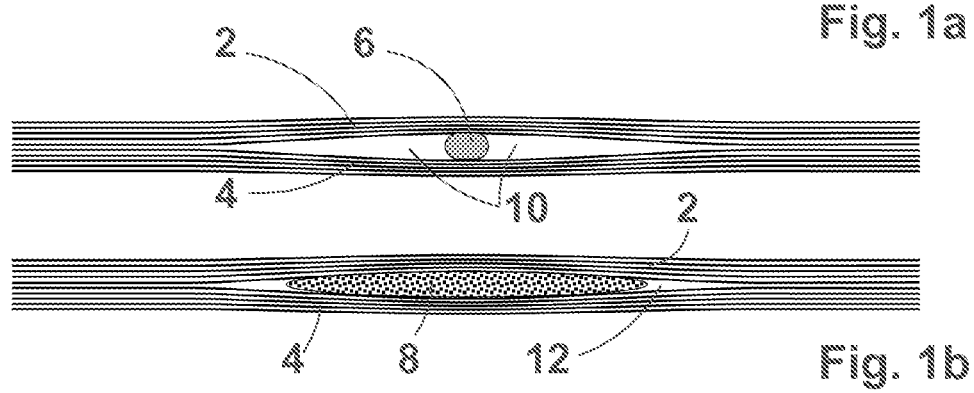
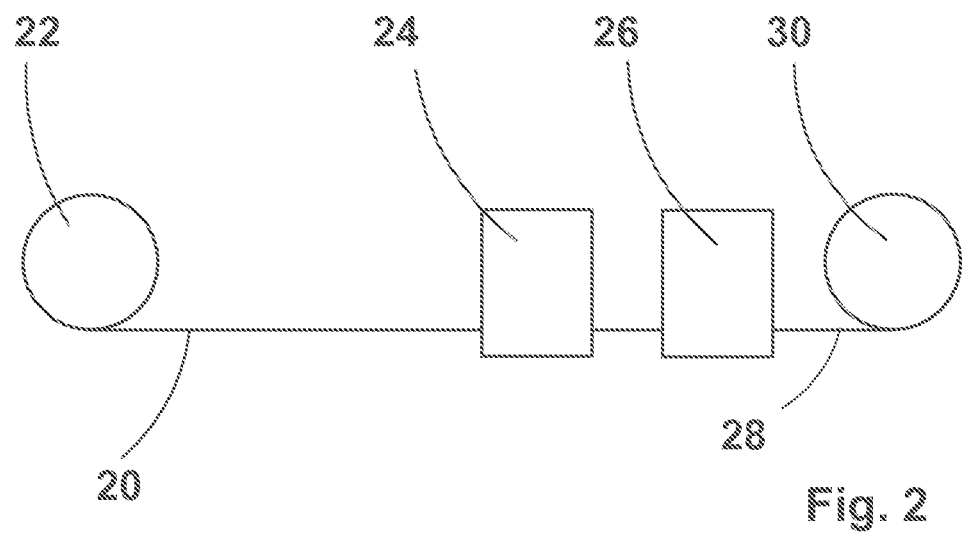

STITCHED UNIDIRECTIONAL OR MULTI-AXIAL REINFORCEMENT AND A METHOD OF PRODUCING THE SAME

RELATED APPLICATIONS

This application is the U.S. national phase of International Application No. PCT/FI2013/050765 filed 15 Jul. 2013 which designated the U.S. and claims priority to EP 12177268.5 filed 20 Jul. 2012 and FI 20135470 filed 7 May 2013, the entire contents of each of these applications are hereby incorporated by reference.

TECHNICAL FIELD

The present invention relates to a stitched unidirectional or multi-axial reinforcement and a method of producing a stitched unidirectional or multi-axial reinforcement. The stitched unidirectional or multi-axial reinforcement of the present invention may be used in all such applications that reinforcements are generally needed and especially in such applications where either Vacuum Infusion technology or Resin Transfer Molding (RTM) technology for distributing the resin in the mold is used. The stitched unidirectional or multi-axial reinforcement of the present invention is especially applicable in the manufacture of wind turbine blades, boats, and generally in all such structures that longitudinal forms are needed.

BACKGROUND ART

When manufacturing composite and laminate products using various fibers, like for instance glass, carbon and aramid fibers as well as flax, hemp, jute, kenaf, basalt and other natural fibers etc. for the manufacture of, for instance, boat, automotive and wind turbine parts, for example, the manufacture starts with the production of an appropriate fiber reinforcement like woven or knitted structure which may have a unidirectional or multi-axial in orientation. The structures, then, placed in a mold used in the manufacture of the intermediate or end product. The mold has, naturally, the shape of the end product meaning that the shape may sometimes be very complicated, and require substantial shaping of the reinforcement when placed in the mold. Normally several layers, up to tens of layers, of reinforcements are placed one on top of another in the mold and a thermosetting resin like epoxy mixed with hardener or unsaturated polyester resin or vinyl ester resin is introduced in the mold for forming a fiber-reinforced composite article. Resin may also be thermoplastic like PA (polyamide) or CBT (Cyclic Polybutylene Terephthalate) or alike. Practice has shown that when the end product has to resist high mechanical loads, unidirectional reinforcements, which may be held together by means of stitching, are a preferred choice in its manufacture. Such unidirectional reinforcements are made of rovings or tows, generally called as reinforcing fibers.

The unidirectional reinforcement is normally formed of one or more layers of reinforcing rovings. Multi-axial reinforcement is formed of two or more layers of reinforcing rovings, where the rovings in one layer are unidirectional but rovings of adjacent layers for a certain angle, usually 45, 60 or 90 degrees. The construction of the reinforcement depends on the target areal weight and the tex number of the rovings. For instance if a high areal weight is desired, a thick roving (for example with E-glass 2400 tex) is used, and where a reinforcement with low areal weight is desired, a thin roving (for example with E-glass 600 tex) is used in its manufacture.

The end product, i.e. cured laminate structure may be made of a number of such unidirectional or multi-axial reinforcements either by arranging the layers of reinforcements such that, in the end product, the rovings of each layer are parallel or some layers are oriented in other directions according to loads the laminate construction is subjected to or by first manufacturing fabrics of several layers of unidirectional reinforcements so that the rovings of adjacent layers form a certain angle, and thereafter using the fabrics thus formed in the production of the end product. Such fabrics are called biaxial, triaxial, quadaxial etc. fabrics depending on the number of different fiber orientations therein.

A unidirectional reinforcement is inherently unstable in nature as yarns run in one direction only. In order to be able to handle the unidirectional reinforcement, its rovings have to be anchored or bonded to each other in a suitable manner. Prior art knows, in principle, two different mechanical methods for such a purpose.

One method is to secure the rovings by means of stitching (e.g. warp knitting). The stitching yarns form knitting loops, i.e. stitches, which are holding the actual reinforcing rovings, in their place in the reinforcement. The stitches are formed by various knitting elements, e.g. by needles, which penetrate the layer or layers of reinforcing fibers according to the known warp knitting technique. The stitches may form several well known patterns like for instance chain or tricot etc. The stitching yarn is typically, but not necessarily, texturized or non-texturized polyester (polyethylene terephthalate) filament yarn having a thickness from about 34 dtex to about 167 dtex and comprising tens of filaments, normally e.g. 24 or 48 filaments.

Another mechanical method is to use weaving technique to anchor the longitudinal warp yarns with light weight weft yarns in their respective place. As weft yarns both non-coated and hot-melt coated yarns have been used. After heating and cooling the hot melt binder has given the reinforcement considerable stability. Yet the weaving alternative is not any more considered favorable as the reinforcing yarns form kinks when crossing over the weft yarns leading to stress concentrations and lower mechanical properties than knitted versions. The hot melt binder yarns have been found to create local disturbance in matrix curing and are not either favored any more in the trade. Typically, the weft yarns are multifilament yarns that get flat under compression irrespective of their being hot-melt yarns or not.

A chemical method for bonding the unidirectional rovings together by means of various thermoplastic binders has also been brought to market. However, mainly due to problems in resin permeability, handling stiffness and wet-out distance, these reinforcements and methods have not been taken into use in wider scale.

Stitched reinforcements are well known and they have a few good properties. Firstly, their transverse stability is good because the stitching yarns although running mainly longitudinally form such patterns, like tricot, that give the unidirectional rovings the integrity needed for the reinforcement. Secondly, the reinforcement is easy to position in the mold (i.e. make the reinforcement follow the contours of the mold) as the stitched reinforcement is often very flexible if stitching parameters are properly chosen like stitch length, needle gauge and yarn tension, just to name a few as an example.

The use of stitches, however, results in a problem, too. The problem may be seen when infusing a stack of stitched reinforcements, i.e. so called preform, with resin. The resin distribution in fiber bundles is surprisingly slow and uneven in both directions, i.e. in a direction parallel with the reinforcing fibers and in a direction transverse to the reinforcing fibers. The above finding is surprising as at a first glance a stitched reinforcement seems to include flow passages in three dimensions. The stitches when tightened around a bundle of rovings open flow passages through the reinforcement. Also in the direction of the stitch yarns parallel with the surface of the reinforcement the rovings are pressed together such that flow passages on the surface of the reinforcement are created. And also in the direction of the rovings the tightening of the stitches form longitudinal flow passages on the surface of the reinforcement. It could be expected that, when placed a reinforcement on top of another in the mold, the stack of reinforcements would include a three-dimensional network of flow passages, which would ensure a rapid resin flow and penetration as well as quick wet-out of the stack of reinforcements. However, as already mentioned above, that is not the case. The main reason is that before the resin feed to the mold is initiated the stack of reinforcements in the mold is subjected to compression. The compression makes the reinforcements to be pressed against one another by such a force that, as the stitches of the reinforcements are not vertically one directly above another but their positioning is random, the "free" rovings (meaning rovings, which are not under compression by a stitch) between the stitches of one reinforcement are pressed on the stitch of a neighboring reinforcement. As a result the flow passage in the direction of the surface of the reinforcement is more or less totally filled with the "free" rovings preventing efficiently resin flow in the direction of the surface of a reinforcement. As to the part of a stitch where the stitching yarn is in the Z-direction the flow passage remains in the stack, maybe somewhat smaller, but still. However, now that the flow passages in the direction of the surface of a reinforcement are substantially closed, the flow passage in the Z-direction remains filled with air, which is very hard to remove. This easily results in the presence of gas bubbles in the end product, which, naturally, reduces the quality and strength properties of the end product.

As good resin permeability is vital for the practical execution of the molding process it is normally speeded up by utilizing pressure difference when feeding resin in the mold. It is common practice to apply either Vacuum Infusion technology or Resin Transfer Molding (RTM) technology for distributing the resin all over the reinforcement layers in the mold. However, sometimes despite various measures, like vacuum and/or raised feed pressure, small air cavities tend to remain in the reinforcement reducing significantly the strength properties of the laminate. The main reason for the air cavities is the tight positioning of the rovings against each other in the reinforcement such that its permeability to resin is in both transverse and longitudinal directions of the reinforcement rovings as well as in Z-direction limited. In view of the above, new ways to improve both the removal of gas from the stack of reinforcements and the permeability of the reinforcement to resin should be investigated.

One way to improve the permeability of the reinforcement is to provide the reinforcement with flow passages for resin, the flow passages allowing the resin to flow quickly in the reinforcement. There may be found, in prior art, numerous ways for arranging the resin flow passages in the reinforcements or between the reinforcements in a stack of reinforcements. However, it has been learned that the use of such flow passages is not very efficient, as the vacuum applied in the infusion stage tends to shift or draw rovings from the neighbouring areas or reinforcements and even shift their positions to fill the flow passages/cavities.

EP-A1-1491323 discloses a reinforcement structure comprising unidirectional reinforcement threads and transverse stiffening threads. The stiffening threads are distributed in a spaced manner on a layer of reinforcement threads. The stiffening threads may be of thermoplastic material such that by fusion or softening the stiffening threads fasten to the reinforcement threads and give the reinforcement the transverse stability it needs. For ensuring sufficient capillary draining of injected resin the layer of longitudinal reinforcement threads is provided with longitudinal draining threads, which are, thus, parallel to one another and to the reinforcement threads. The draining threads are arranged in spaced manner in the layer of reinforcement threads. The draining threads may be formed of glass fibres covered with fibres of sufficient capillarity, like for instance cotton fibers or cellulosic fibers, to drain the injected resin. Another option for the draining threads is reinforcement threads on each of which a monofilament is wound around. Thus a spiral flow passage for the resin is formed. Therefore, it is clear that the flow passages in the reinforcement are formed in the longitudinal direction of the reinforcement.

This means, in practice, that the longer the products to be manufactured are the more complex and, at least time consuming, is the impregnation of the end product with resin. In practice, it is impossible to think about impregnating a spar cap of a wind turbine blade having a length of 50 meters or more economically by lengthwise impregnation. Naturally there is a possibility to arrange resin injections at, for instance, 2 meter intervals over the entire length of a blade, but it is a complicated and time consuming method and, therefore, very expensive.

EP-B1-1667838 discusses the formation of flow passages in a composite fabric formed of a plurality of substantially parallel, coaxially aligned tow groups, each of said tow groups having one or more tows wherein a portion of said tow groups contain two or more tows. The flow of resin along within the fabric is planned to be ensured by arranging spacing between tows in a tow group to be less than the spacing between adjacent tow groups. Thus the spacing between adjacent tow groups should form the required flow passages. Such flow passages should permit resin to flow through the fabric, especially in the direction of the tows, i.e. in the longitudinal direction of the product.

However, as the length of the end product increases it has to be understood that at a certain point the impregnation in longitudinal direction reaches it practical limit, i.e. the so called wet-out distance, whereafter other ways have to be taken into serious consideration. Also, practical experiments have shown that the flow passages will be filled with rovings from nearby areas when vacuum is applied in the infusion stage or the laminate structure becomes corrugated with local kinks in reinforcing rovings reducing mechanical strength.

U.S. Pat. No. 5,484,642 discusses a textile reinforcing material useful for producing composite laminated articles by a general injection-molding technique. The reinforced material, i.e. laminate structure is fabricated by arranging a stack of layers having textile reinforcements in a mold of a shape corresponding to that of the article to be fabricated and, after the mold has been closed, injecting a resin into it. The textile reinforcements may be of woven or non-woven origin including unidirectional slivers. The transverse stability of the reinforcement layers is accomplished by means of weaving, knitting or stitching or by using transverse binding threads or yarns. At least one layer of the stack of textile reinforcements has a structure in which ducts, i.e. flow passages for resin, extend in at least one direction therein to facilitate the flow of the resin during injection. The ducts may be located in longitudinal and/or transverse direction of the material. The main idea behind the above mentioned US patent is to ensure good resin flow properties for the fabric by changing a part of the reinforcing yarns to better withstand compression due to mold closure and vacuum. This is done typically by adding twist to a part of the reinforcing yarns or by twining polyester multifilament yarn around carbon fiber tows. The disadvantage, however, of this concept is that among the normal reinforcing yarns a high number of relatively large yarns are placed that under laminate loading conditions behave quite differently from that of the rest of yarns in the reinforcement. This is mainly due to the often very high twist (260 TPM) that affects the elastic properties of the yarns under loading. Also, the high twist prevents or slows down the resin penetration inside these yarns. This leads to non-homogenous laminate structure where a part of the yarns carries the loads in a different manner. This will finally increase risk of premature laminate failure in static and specifically in dynamic load conditions.

It is worthwhile noting that example 5 of the US-document teaches that the transverse flow passages are formed by arranging weft yarns formed of a 3 K (3000 filaments) carbon thread covered with a polyester thread at 260 turns per meter across the material, whereby spirally advancing flow passages are formed around the covered threads. This could result in good resin flow but 260 TPM is extremely high twist and has a very negative influence on laminate properties according to present state of knowledge. One well known way of improving the impregnation of resin into a stack of reinforcements is to place in the mold both to the bottom and to the top of the stack a plastic scrim or other flow aid material by means of which the resin spreads quickly to the entire top and bottom surface area of the reinforcement. After impregnation and curing the scrims are removed labor intensively from the laminate. The purpose for the scrim is, naturally, to introduce resin quickly to the entire area of the mold so that the Z-direction impregnation of the resin into the stack of reinforcements could start as soon as possible. However, the thicker the stack is, the slower the stack is to impregnate with resin. For instance in wind turbine blades the cross section of the spar cap is almost a square, whereby, for the resin, the center of the stack is hard to reach.

It is also known that sometimes when using unidirectional reinforcements, especially in woven form, some assisting or additional yarns have been added in transverse direction for improving transverse stability or resin flow properties. Typically the yarns are coated with hot-melt or other thermoplastic material and the yarns are of glass fiber or polyester (for instance, twisted bundles of glass filaments—each bundle having typically 60 or more filaments, each filament having a diameter of 10-15 µm) and in coated form tex number typically 100-200 tex. The thermoplastic coating of the yarns is, after weaving, molten, whereby it flows in the void volumes in connection with both the yarn and the rovings and thus bonds the warp rovings and the weft yarn together. The thermoplastic coating is usually formed of PA (PolyAmide) or EVA (Ethylene-Vinyl Acetate) types of materials, whose melting temperature is lowered by means of waxy substances or by some other appropriate means. Therefore thermoplastic coating is typically conflicting with the infusion resin matrix as the relative amount of binder is locally very high in the immediate vicinity of the reinforcing yarn, causing local weak areas in the laminate. The glass or polyester filaments with glue remain on the rovings transverse thereto and give the reinforcement transverse handling stability prior to infusion or alike. The resins will not reach the actual fiber surface as the fibers are coated with thermoplastic material.

The use of this kind of assisting or additional yarns in unidirectional reinforcements will increase unnecessarily weight and possibly cause local fiber distortion, which are, by nature, undesirable effects. Furthermore transverse reinforcing fibers, i.e. for instance fibers oriented in 90, 60 or 45 degree direction, may also create micro-cracks when these fibers, normally glass fibers, are broken during the axial loading of the UD-construction from which more severe fatigue cracks destroying the stability of the end product may originate. The reason for the latter problem is the fact that elongation at break of the glass fiber yarn is significantly lower than that of the matrix in transverse direction. And still further the multifilament glass fiber yarns or rovings deform when subjected to vacuum compressing pressure losing their originally round cross section such that their cross section under pressure is oval or even flat (as shown in FIG. 1b). The multifilament yarn form has as a consequence that its individual filaments move sideways leading practically to the oval or flat cross section formation. The yarns coated with thermoplastic material behave similarly as the coating is melting during the heating-pressing stage, leading to flat form where there is a cross-over point.

In other words, prior art suggests, on the one hand, the use of multifilaments for arranging flow passages in a direction transverse to the direction of the reinforcing rovings, and on the other hand, the use of multifilament yarns arranged in transverse direction for some other purpose, for instance for bonding the rovings with glue or for use as stitches.

Firstly, the prior art twisted threads or yarns, i.e. multifilaments used for forming the transverse flow passages have a diameter (before applying compression) of about 0.35-0.45 mm. In the performed tests a laminate was formed by placing a stack of two 1200 g/m² reinforcement layers having transverse threads of the above mentioned size between the reinforcements in a mold, subjecting the stack to vacuum, performing the infusion with resin, and allowing the laminate to harden. It was learned that the cross section of the multifilament threads was changed to oval or flat while the reinforcement layers were compressed by the applied vacuum in the infusion stage. When comparing the wet-out distance of the reinforcement to that of a reinforcement having no crosswise arranged yarns it was learned that it had not changed or improved at all or the change was, in practice, insignificant. The reason will be discussed in more detail later on.

Naturally, it could also be argued that stitching yarns or corresponding threads running in a direction transverse to the longitudinal direction of the reinforcement rovings could form transverse flow passages for resin. However, it has to be understood that, in addition to the problems involved in the use of stitches discussed already above, the same flattening tendency applies to the stitches and stitching yarns, too.

Reinforcements provided with hot-melt weft yarns have been on the market about 20 years ago, but they have not succeeded in passing strength tests, neither static nor tensile tests. Additionally the plastic formability of such reinforcements was poor. It is, in practice, impossible to use such reinforcements in the production of spar cap laminates for wind turbine blades as the spar caps have double-concave forms to which this kind of reinforcement cannot be bent.

Secondly, reinforcements having transverse glass fiber yarns with a thermoplastic coating have been considered. I such reinforcements the diameter of the coated yarn was of the order of 0.30-0.35 mm, and the diameter, or in fact the Z-direction thickness, of the core yarn was of the order of 0.04-0.06 mm when pressed and coating melted or removed. The difference these thermoplastic coated yarns have when compared to non-coated yarns, for example stitching yarns, is that during bonding these yarns to the rovings of the actual reinforcement, i.e. during the melting of the coating, the yarns change their shape in contact points (compression reduces the Z-direction thickness of the yarns), whereby local flow restrictions are formed. In other words, in points where the coated yarn is not compressed, its diameter remains on the original level, but in points of compression the diameter/thickness is reduced to even below the diameter of the core yarn, i.e. the core of the yarn is flattened by the compression. Another problem involved in the use of coated yarns is that the yarn is stiff and relatively thick, whereby it makes the direction of the rovings deviate sharply locally from their straight direction, i.e. forces the rovings to bend and form kinks with problems discussed already earlier as well as later on in this paragraph. A yet further problem with the coated yarns is the coating polymer itself, as it is normally not compatible with the resin and thus contaminates the laminate and thus creates weak spots in the reinforcement. Now a laminate was formed of reinforcement layers each bonded by the transverse coated glass fiber yarns to give stability. It was learned that the wet-out distance of the stack of reinforcements was mostly acceptable. But when the laminate, thus having transverse glass fiber yarns with a diameter or thickness changing between about 0.35 and about 0.04 mm, was subjected to fatigue testing, it was learned that soon after the start of the tensile-tensile fatigue testing micro cracking of the laminate was observed. When examining the laminate and especially the micro-cracks in detail it was learned that the micro-cracks were found at the junctions of the reinforcement rovings and the coated transverse yarns. A clear doubt was that the reason for the micro-cracking was the local large diameter of the thread creating bends or kinks in the rovings. Additionally, the hot melt yarns, i.e. also the core yarns, when heated, are compressible, whereby local flattened areas are created, which reduce the cross section of flow passages and thus hamper resin flow at the infusion stage.

As the starting point for the further development of an optimal reinforcement is a stitched reinforcement in which the problem relating to handling stability has been taken care of. The handling stability of the stitched reinforcement of the present invention is excellent, as the flexibility of the reinforcement is ensured by arranging stitching yarns/fibers stretching crosswise over the reinforcement for giving the material stability in transverse direction. Thus the stitched unidirectional or multi-axial reinforcement of the present invention, for instance, does not need transverse bicomponent threads or thick yarns for ensuring the transverse stability of the product, whereby also the risk of creating bends in the rovings by the thick fibers resulting in weak spots in the end product and, in stress conditions, micro cracking of the product is obviated.

However, the practice has shown that the present day stitched reinforcements have several problem areas, like for instance:

the stitched unidirectional or multi-axial reinforcement has limited permeability to resin, at least when the product is a lengthy object, and gas bubbles or dry regions between the filaments of UD rovings remain easily in the stack of stitched reinforcement and cannot be removed even in vacuum infusion, whereby they may considerably reduce the strength of the end product even further.

DEFINITIONS

The following illustrative explanations are provided to facilitate understanding of certain terms used frequently in the specification and claims discussing the present invention. The explanations are provided as a convenience and are not meant to limit the invention.

Areal weight—Weight (mass) per unit area of a single ply of dry reinforcement fabric.

Binder—A polymer material in various forms like powder, film or liquid. The binders may be made of one or several individual binders having different characteristics in chemical or physical properties like stiffness, melting point, polymeric structure, Tg etc. Binder is used to fix together the fiber structure to form a web and finally the reinforcement. Suitable binders are thermoplastic epoxies, co-polyesters, bisphenolic unsaturated polyesters, or their mixtures, just to name a few examples.

Fabric—a flexible woven material consisting of a network of natural or man-made artificial fibres often referred to as thread or yarn. Fabrics are formed, for example, by weaving, knitting, crocheting, knotting, needling or pressing fibres together (felt).

Laminate—A material that can be constructed by impregnating one or more layers of reinforcement using appropriate resin and hardener mixture and let it harden either by chemical reaction or cooling down of temperature. The laminate is a fiber reinforced structure made of a matrix reinforced by fine fibers of for instance glass, carbon, aramid etc. The matrix may be epoxy, a thermosetting plastic (most often epoxy, polyester or vinylester) or a thermoplastic. Common end uses of glass fiber reinforcements include boats, automobile parts, wind turbine blades, etc.

Matrix—material that binds together the reinforcements to form a composite. Composites use specially formulated polymers, like thermosetting epoxy, vinylester or unsaturated polyester resin, and phenol formaldehyde resins or a thermoplastic resin (see 'Polymer') just to mention a few examples.

Monofilament—A yarn composed of a single continuous filament typically made of synthetic material, such as polyamide (nylon), polyethylene terephthalate, polypropylene, polybutylene terephthalate etc.

Multifilament—A yarn or thread composed of a multitude of continuous filaments typically made of synthetic material, such as polyamide (nylon), polyethylene terephthalate, polypropylene, polybutylene terephthalate etc. Especially, in connection with the present invention, multifilament means a bundle of filaments that may or may not be twisted and that have not been bonded to one another, but may, unless heavily twisted, move sideways when subjected to compression.

Polymer—Generally includes, for example, homoplymers, copolymers, such as for example, block, graft, random and alternating copolymers, terpolymers, etc, and blends and modifications thereof. Furthermore, unless otherwise specifically limited, the term "polymer" includes all possible geometrical configurations of the material. These configurations include, for example, isotactic, syndiotactic and random symmetries.

Reinforcement—a web comprising of reinforcing fibers, the fibers being anchored to one another by appropriate means. Often manufactured as continuous webs. There are several ways to manufacture the reinforcement in unidirectional or multi-axial or random orientations, e.g. through the textile processing techniques of weaving, knitting, braiding and stitching or by bonding with an appropriate binder.

Reinforcing fibers—fibers used together with a matrix in the manufacture of composite materials. The fibres are usually man-made fibers like glass (including all its variants), carbon (with all its variants) or aramid, which may be used as both continuous filaments and non-continuous fibers. Also wide range of natural fibres such as sisal, flax, jute, cocos, kenaf, hemp, or basalt, just to name a few, have been used.

Resin Transfer Molding (RTM)—A process having two mould surfaces by which a resin is pumped typically at low viscosities and low or high pressures into a closed mold die set containing often a preform of dry reinforcement, that is, to infuse resin into the preform and to make a fiber-reinforced composite part.

Roving—a long and narrow untwisted bundle of continuous fibres or filaments, particularly glass fibres. In this application synonym to tow, whereby the selection of fibres not only contain glass fibres but also carbon, basalt and aramid fibres, more generally man-made continuous fibres.

Roving group or tow group—one or more tows or rovings that are closely spaced.

Stitching yarn—A yarn formed of 24 or 48 individual filaments made of texturise polyester. Stitching yarn used normally in the manufacture of unidirectional reinforcements has typically a linear mass density of 76 or 110 dtex. The diameter of an individual filament is typically 5-10 µm.

Tex number—An SI-unit of measure for the linear mass density of yarns and is defined as the mass in grams per 1000 meters. Tex is more likely to be used in Canada and Continental Europe, while denier remains more common in the United States and United Kingdom. The unit code is "tex". The most commonly used unit in connection with man-made synthetic fibers is actually the decitex, abbreviated dtex, which is the mass in grams per 10,000 meters.

Textile—general definition for various types of articles including sheets, webs, fabrics and mats having one or more layers, the layers being formed of uni- or multidirectional threads Thermoplastic—A polymer that is fusible, softening when exposed to heat and returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, caprolactams, copolymers of ethylene and at least one vinyl monomer (e.g., poly (ethylene vinyl acetates), cellulose esters and acrylic resins.

Thermoset—A polymer material that irreversibly cures. The cure may be done through heat (generally above 200 Celsius), through a chemical reaction (two-part epoxy, for example), or irradiation such as electron beam processing.

Thread—twisted bundle of unitary filaments, yarn.

Tow—In the composites industry, a tow is an untwisted bundle of continuous filaments, and it refers to man-made fibres, particularly carbon fibres (also called graphite). Tows are designated by the number of fibers they contain, e.g., a 12K tow contains about 12,000 fibres. Here synonym to roving.

Transverse handling stability—A force that prevents a unidirectional reinforcement from being deformed or torn into pieces. Needed when positioning a reinforcement in a mold on top of another reinforcement and moving the reinforcement in a direction transverse to its longitudinal direction.

Unidirectional (UD) reinforcement—Reinforcement in which all of the rovings or tows run in the same direction, in this particular case in longitudinal direction, but a UD-reinforcement may also be transversal, i.e. oriented at 90° direction. These rovings are often in prior art UD reinforcements bound by means of stitching and typically using some additional light layer of chopped strands or continuous multifilament yarns to hold the rovings together and to prevent their tearing into bundle formation, or by weaving where weft yarn gives the stability. The weft yarn may also be hot-melt coated. Another way of binding the rovings or tows together is the use of a binder, for instance a thermoplastic or thermoset binder. Also in that case above mentioned additional stabilizing layers may be used.

Vacuum Infusion—A process using a one-sided mould that shapes the end product. On the lower side is a rigid mould and on the upper side is a flexible membrane or vacuum bag. When vacuum/suction is applied to the mould cavity air escapes from the cavity, whereafter resin is allowed to be infused by the suction (or additionally assisted by small overpressure at the feed side—a feature characteristic to light RTM) to completely wet-out the reinforcements and eliminate all air voids in the laminate structure.

Wet-out distance—The position of the flow front or actually the distance measured from the place resin entered the reinforcement stack to the present position.

Yarn—A long continuous length, often twisted, multifilament, suitable for use in the production of textiles, sewing, crocheting, knitting, weaving, stitching, embroidery and ropemaking. Yarns may be made of continuous or non-continuous natural or synthetic fibers.

Z-direction—The direction perpendicular to the plane of the layer or the stack of layers, i.e. thickness direction.

BRIEF SUMMARY OF THE INVENTION

An object of the present invention is to offer a solution to at least one of the above discussed problems.

Another object of the present invention is to develop a novel unidirectional or multi-axial stitched reinforcement having excellent permeability to resin in a direction transverse to the reinforcing filament orientation.

A further object of the present invention is to develop a novel unidirectional or multi-axial stitched reinforcement having excellent capabilities to allow air to escape from a stack of reinforcements during vacuuming/degassing and subsequent wetting-out the stack with resin in a direction transverse to the reinforcing filament orientation.

A yet further object of the present invention is to speed up the production of unidirectional or multi-axial reinforcements.

The required permeability to resin of the reinforcement and the required removal of gas from the reinforcement of the present invention are ensured in accordance with a preferred embodiment of the present invention by using transversally oriented thin discrete means for forming flow passages in connection with the stitched unidirectional or multi-axial reinforcing rovings for arranging free flow area in a direction transverse to the direction of the unidirectional or multi-axial rovings both for the air to escape from the reinforcement and for the resin to impregnate or wet-out the product efficiently.

At least one of the prior art problems is solved and at least one of the objects achieved by means of a stitched unidirectional or multi-axial reinforcement for the manufacture of fiber reinforced composites by one of resin transfer molding process and vacuum infusion molding process, the stitched unidirectional or multi-axial reinforcement comprising at least one layer of continuous unidirectional rovings arranged in the reinforcement, bonded to each other by means of stitching and being provided with means for facilitating, when wetting-out a stack of reinforcements with resin, the flow of resin in a direction transverse to the direction of the unidirectional rovings, wherein the impregnation facilitating means are thin discrete means for forming flow passages for resin arranged transverse to the unidirectional or multi-axial rovings, the thin discrete flow passage forming means forming to the sides thereof flow passages extending from one edge of the stitched unidirectional or multi-axial reinforcement to the opposite edge thereof.

In a similar manner at least one of the prior art problems is solved and at least one of the objects achieved by means of a method of producing a stitched unidirectional or multi-axial reinforcement for fiber reinforced composites comprising the steps of:
a) laying continuous rovings unidirectionally side by side for forming at least one layer,
b) laying thin discrete flow passage forming means in a direction transverse to the direction of the unidirectional rovings at least on the continuous rovings of said layer,
c) stitching the thin discrete flow passage forming means and the continuous rovings to one another to form a reinforcement.

Other characteristic features of the stitched unidirectional or multi-axial reinforcement of the present invention and the method of its manufacture are disclosed in the appended patent claims.

With the present invention at least some of the following advantages may be reached
the permeability of stitched unidirectional or multi-axial reinforcements is improved to such a level that facilitates good resin flow,
simultaneously with the wetting-out of the product, remaining air escapes from the product so that, in practice, no gas bubbles or dry regions between the UD-filaments are left in the product after impregnation,
the distance the resin advances in transverse direction is increased considerably, in the performed experiments to at least 2.5-fold,
the time needed for the impregnation is reduced considerably, in the performed experiments to at least one sixth of the time needed with prior art reinforcements,
the drawbacks of prior art thick flow generating structures for a stitched structure are minimized,
the drawbacks relating to chemical disturbances are minimized, and
the end product has excellent strength and fatigue properties.

BRIEF DESCRIPTION OF DRAWING

In the following, the stitched unidirectional or multi-axial reinforcement of the present invention and the method of its production are discussed in more detail with reference to the appended figures, in which FIGS. 1a and 1b illustrate schematically a comparison between the behaviors of a thin discrete flow passage forming means, in this case monofilaments and a multifilament yarn under compression between two reinforcements or layers of rovings, FIG. 2 illustrates schematically the production process of the stitched unidirectional or multi-axial reinforcement in accordance with a preferred embodiment of the present invention.

DETAILED DESCRIPTION OF DRAWINGS

Figure 3A:
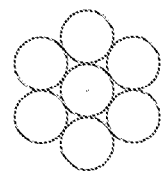
FIGS. 3a-3d illustrate various options for replacing a discrete monofilament with a bundle of monofilaments bonded together, and FIG. 4 compares a prior art stitched reinforcement with two stitched reinforcements of the present invention in view of resin flow distance in transverse direction.

In the above four different facts concerning the arrangement of transverse flow passages for resin in connection with reinforcements have been discussed. Firstly, that the use of a thermoplastic coated yarns is not desirable due to incompatibility of the thermoplastic material with the matrix material. Secondly, that if a thread after having been subjected to compression due to vacuum in the mould has a Z-direction thickness of 0.35-0.4 mm it is too thick, whereby the risk of creating micro-cracks in dynamic loading in the end product is high. Thirdly, that a multifilament thread without coating gets flat or oval under compression thereby destroying the resin flow properties. Fourthly, the manufacture of lengthy reinforced objects like for instance spar caps for wind turbine blades is, in practice, impossible without an efficient way to arrange the resin flow and impregnation of the stack of reinforcements, i.e. so called preform, in a direction at right angles, i.e. transverse to the direction of the unidirectional reinforcement rovings. Due to the above facts the use of transverse thin discrete means for forming flow passages for resin of much smaller diameter were tested and the final laminates were compared with prior art laminates formed by using transverse multifilaments whose main task was to give the reinforcement transverse stability. Here it has to be understood that the phrases "thin discrete means for forming flow passages" or "thin discrete flow passage forming means" include, but are not limited to, monofilaments, as discussed in more detail in FIGS. 3a-3d. Multifilaments could also be considered to create flow passages for resin between the stitched reinforcement layers. After extensive testing including the comparison of both wet-out distance and fatigue testing it was learned that an optimal range for the diameter of transversely arranged thin discrete flow passage forming means is between 100 and 200 µm, preferably between 130 and 170 µm. However, in cases with light reinforcements somewhat smaller diameter, i.e. down to 70 µm may be used, and in a similar manner with especially heavy reinforcements diameters up to 300 µm may be used. As to the above discussion relating to the diameter as well as the various discussions concerning the diameter later on in this specification it has to be understood that, in case the monofilament or thin flow passage forming means is somewhat compressible the diameter should be considered the mean the Z-direction dimension of the monofilament or thin flow passage forming means. The tests showed that the resin flowed very quickly into the cavities and pushed all residual air away where it was trapped during the vacuuming stage and prior to starting of the infusion. When the wet-out distance of the stack of reinforcement layers with thin discrete flow passage forming means having a Z-direction thickness of 170 μm was compared to that of the prior art laminate having no transverse flow passages it was observed that the wet-out distance of the stack of the invention was at least 6-fold. Also, when the thus formed laminate was allowed to harden its fatigue properties were tested and compared with those of the prior art laminate having no transverse flow passages, it was observed that the fatigue properties of the laminate of the invention were, in practice, equal with the prior art laminate. In some laminates even better than those of the prior art laminate. The only reason for possibly improved fatigue properties is better removal of air from the stack of reinforcements, i.e. so called preform, in the vacuum infusion stage. Thus, the wet-out distance was increased to at least 6-fold without having to sacrifice the strength properties of the laminate at all.

The next experiment was to test whether threads, i.e. multifilaments could be used for creating the flow passages. Since it was learned in the earlier experiments that arranging a thin discrete flow passage forming means, i.e. a monofilament, having a Z-direction thickness or diameter of 170 μm did not reduce the fatigue properties of the final laminate, the experiment aimed at first finding out what kind of multifilament yarn is needed to ensure that its Z-direction dimension under compression is about the same as that of the thin discrete flow passage forming means in the earlier experiments. In other words, between the reinforcement layers such multifilaments were placed that did not force the rovings too far apart, when compressed, any more than the thin discrete flow passage forming means of the earlier experiments. Thus it is obvious that the strength and fatigue properties of the laminate would not be decreased due to the thickness of the thread.

Immediately it was learned that the wet-out distance of the stack of reinforcements, i.e. so called preform, was maintained substantially at the low level of the prior art laminate, i.e. a laminate comprising a stack of reinforcement having no transverse threads or yarns at all, except for the stitches.

FIGS. 1a and 1b illustrate schematically the cross section comparison between the behaviors of a thin discrete flow passage forming means of the present invention, in this case a monofilament, and a multifilament yarn under compression of vacuum infusion process between two reinforcements or layers of rovings. FIG. 1a illustrates a cross section of two overlapping reinforcements 2 and 4 made of bundles of rovings each stitched by means of transverse stitching (not visible) together as a layer having a monofilament 6 therebetween arranged at right angles to the UD-rovings. FIG. 1b shows the same reinforcements 2 and 4 made of bundles of rovings stitched by means of transverse stitching together as a layer having a multifilament yarn 8 therebetween arranged at right angles to the rovings. FIG. 1a shows that the monofilament still pushes or keeps the rovings of the reinforcements 2 and 4 apart such that open flow passages 10 are formed between the reinforcements 2 and 4 to the sides of the monofilament 6. FIG. 1b shows the rovings of the reinforcements 2 and 4 pushed apart in a manner equal to FIG. 1a, i.e. the thickness of the two reinforcements with the transverse monofilament or multifilament is the same. However, it may be seen that the multifilament yarn 8 needed for pushing or keeping the rovings apart is of totally different size and cross sectional area. It has transformed oval or flat under compression such that, in practice there are no true flow passages 12 at the sides of the multifilament yarn 8.

The reason is that the multifilament yarns are made of tens or hundreds of individual filaments, each filament having a diameter of 5-10 μm. When the multifilament yarn is subjected to compression pressure, i.e. in the vacuum infusion stage in the mold, the filaments of the multifilament yarns are forced to move sideways so that the Z-direction dimension of the multifilament yarn is a fraction of the apparent original diameter of the multifilament even if it is twisted. The twist is typically quite low, of the order of 20-40 turns per meter, as it is important that resin is able to penetrate also between the filaments of twisted yarn to avoid dry spots. In accordance with performed tests it was learned that a multifilament, i.e. a polyester yarn having a thickness of 130 μm under compression with 0.5 bar (small compared to infusion compression of 0.95 bar), has a dtex number of 1120 dtex whereas a monofilament having a similar diameter of 130 μm with and without compression has a much lower dtex number of 167. A glass fiber yarn may have in the same conditions a dtex number of about 18-fold compared to that of a monofilament. This means, in view of the resin flow, that each filament moving sideways decreases the cross section of the cavity at the side of the multifilament such that the channel cross section is finally, in practice insignificant. This prevents the resin flow through these voids or channels.

Yarns with high twist, of the order of 150 TPM (TPM=turns per meter) or more, could be effective in resisting the compressive effect of vacuum. Yet they are not favored in composite end use due to their slow and incomplete resin penetration properties and also due to their fibers being in coil formation with unfavorable elastic response under tensile load compared to their adjacent non-twisted roving yarns. Moreover twisted yarns are stiff in character leading to kinks in reinforcing UD-rovings. When twisted yarns are used their twist is typically relatively low, i.e. of the order of 20-40 TPM, as it is important that resin is able to penetrate between the filaments of twisted yarn.

The same phenomenon applies to stitches tightened around the bundles of rovings, whereby the originally round cross sectional shape of the yarn is transformed to oval or even flat "ribbon-shape" such that the thickness of the ribbon is of the order of 5-40 μm.

FIG. 2 illustrates schematically the production process of the stitched unidirectional or multi-axial reinforcement in accordance with a preferred embodiment of the present invention. The manufacture of a stitched unidirectional or multi-axial reinforcement proceeds as follows. First a uniform layer 20 of unidirectional rovings (preferably but not necessarily glass fiber or carbon fiber tows or aramid fibers as well as flax, hemp, jute, sisal, cocos, kenaf, basalt or other natural fibers) is formed by pulling them from the packages 22 and arranging them side by side or in a controlled distance from each other depending on the targeted areal weight. From now on the word "rovings" is used to refer to all such tows, rovings, fibers etc. that are used in the manufacture of unidirectional reinforcements. Thus the rovings are arranged side by side in one or more layers of rovings.

The layer 20 is then directed to a device 24 introducing or laying thin discrete flow passage forming means on the layer transverse to the travel direction of the layer. The thin discrete flow passage forming means of the present invention has a diameter of 70-300 μm, preferably of 100-200 μm, and more preferably between 130-170 μm. At this stage it has to be understood that the flow passage forming means has to be chosen such that, even if the flow passage forming means is somewhat compressible, the Z-direction dimension of the flow passage forming means, when compressed in the infusion stage, is of the order of 70-300 μm, preferably of 100-200 μm, more preferably between 130-170 μm. The diameter, or Z-direction thickness, is ideal in case the viscosity of infused resin-curing agent mixture is on the level of 200-350 mPas at room temperature. If viscosity differs clearly from this, it may be necessary to adjust the distance between flow passage forming means or the diameter/Z-direction thickness thereof. Here the word 'transverse' has to be understood broadly, as the direction of the thin discrete flow passage forming means may lie between ±45 degrees, i.e. from −45 degrees to +45 degrees, from the direction at right angles to the rovings of the unidirectional web, i.e. the direction of the thin discrete flow passage forming means deviates at least ±45 from the direction of the unidirectional rovings of the layer. The thin discrete flow passage forming means may be arranged on the layer 20 at '24' by using a well known yarn carriage system of multi-axial production machines, i.e. by means of a tool that travels transversely back and forth above the layer laying a certain number of thin discrete flow passage forming means on the layer at a time. The laying may, for instance, be facilitated with servolinear movement manipulator with thin discrete flow passage forming means feeding arrangement.

Another possible way of laying the thin discrete flow passage forming means is to arrange a rotating wheel at '24' in a plane substantially at right angles to the layer round the layer, whereby the wheel winds the thin discrete flow passage forming means round the layer. By using the rotating wheel the thin discrete flow passage forming means are arranged simultaneously on both the top and the bottom surfaces of the layer. When using this kind of an application for winding the thin discrete flow passage forming means round the layer, it has to be ensured that the thin discrete flow passage forming means are not able to bend the rovings at the sides of the layer thus narrowing it. Thus the tightness of the thin discrete flow passage forming means has to be adjusted properly, and, preferably means for preventing the bending has to be arranged between the thin discrete flow passage forming means application and the stitching. The means may be, for instance, guide rails extending along the edges of the layer 20 from the apparatus winding the thin discrete flow passage forming means round the layer and outside the rails up to the next process step, i.e. the stitching 26.

An advantageous feature of the present invention is that the thin discrete flow passage forming means are laid on the layer in straight, parallel formation, i.e. the thin discrete flow passage forming means run linearly and uniformly from one edge of the layer to the opposite edge thereof, in other words the thin discrete flow passage forming means, for instance, do not form loops found typically in knitting patterns. Essentially straight, i.e. linear and flat formation of thin discrete flow passage forming means across the unidirectional reinforcing rovings ensure shortest resin flow time between the reinforcement edges as straight line is the shortest way between two points. Irrespective of the actual location of the thin discrete flow passage forming means they are arranged at regular intervals, i.e. at about 2 to 50 mm, preferably 5-25 mm, more preferably at about 10-20 mm lateral distance or spacing from one another on both sides of the reinforcement. The exact distance must be optimized according to resin viscosity and layer gram weight. Due to the later stitching operation thin discrete flow passage forming means may locally shift sideways leading to local areas where two thin discrete flow passage forming means may lie side by side.

However, it has to be understood that the above discussion refers to the simplest method of manufacturing reinforcement. Basically the same method may be applied in the manufacture of reinforcements having several in itself unidirectional layers. If a multi-axial reinforcement having several layers is to be manufactured as many additional means for forming new layers at least one having new orientation for rovings and means for laying thin discrete flow passage forming means on the new layers are arranged one after another as the number of additional layers is.

In such a case the thin discrete flow passage forming means may be placed on top and/or bottom surface/s of the reinforcement or between the layers thereof. It is also possible to manufacture multi-axial reinforcements including unidirectional, biaxial, triaxial, and quadraxial reinforcements having thin discrete flow passage forming means running transverse to the actual reinforcement fibers. After a desired number of layers are formed, the set of layers is taken to the next process stage, i.e. bonding by means of stitching.

In the bonding step 26 the set of layers, i.e. a multi-axial web and the thin discrete flow passage forming means are stitched to one another to form a unitary reinforcement 28 having unidirectional or multi-axial reinforcement rovings and transverse thin discrete flow passage forming means attached to one another. Thereafter the reinforcement 28 is rolled at 30 for delivery to a customer. In accordance with another preferred embodiment of the present invention the thin discrete flow passage forming means are arranged between any two layers of rovings in a stitched unidirectional or multi-axial reinforcement, i.e. not only on at least the top and/or bottom surface/s of the reinforcement, but between the layers of rovings, too. In other words, if the reinforcement comprises four layers of rovings, the thin discrete flow passage forming means may be positioned between each layer of rovings or between the second and third layer, i.e. to the center of the reinforcement. In practice, this means that the laying of unidirectional rovings for forming the web and laying the thin discrete flow passage forming means have to be performed in such a sequence that, first, a layer, or layers, of unidirectional rovings are laid, thereafter a set of thin discrete flow passage forming means, and thereafter the next layer/s of unidirectional rovings etc. Only after the desired layering of the reinforcements and the thin discrete flow passage forming means the layers and thin discrete flow passage forming means are bonded together by means of stitching.

In accordance with a preferred additional embodiment of the present invention that may be applied to both of the above discussed embodiments the stitching and the positioning of the thin discrete flow passage forming means, more specifically the length of the stitches and the distance or spacing between adjacent or neighboring thin discrete flow passage forming means should be arranged such that at most one thin discrete flow passage forming means is left within the stich. In theory this means that the length of a stitch is less than the gap between neighboring thin discrete flow passage forming means. However, as the laying of the thin discrete flow passage forming means does not necessarily result in exactly linearly running thin discrete flow passage forming means, the stitch length should be clearly less than the gap between neighboring thin discrete flow passage forming means. The reason for this precautionary measure is that if two or more thin discrete flow passage forming means are located within a stitch the stitching yarn draws the thin discrete flow passage forming means together, i.e. side by side, whereby a true gap to the next adjacent thin discrete flow passage forming means is too long for proper infusion of resin.

As shown schematically in FIG. 1*a* the thin discrete flow passage forming means 6 used between the reinforcement layers 2 and 4 for improving both the permeability of the stack of reinforcements to resin in transverse direction and air removal from between the stack of reinforcement layers create small flow passages 10 on both of their sides and between the reinforcing unidirectional rovings.

The stack of reinforcements of the present invention functions in the infusion stage such that infusing resin will flow through the flow passages 10 crosswise to reinforcing rovings and then penetrate between the individual reinforcement rovings or filaments and secure fast resin flow and good impregnation. During the infusion the advancing resin pushes the remaining air bubbles along the chambers or cavities inside the reinforcement structure to the flow passages and finally out of the product. Both the advancing of the resin and removal of the air may additionally be facilitated by pressurizing the feed of the resin in case stiff upper moulds are in use like in RTM or Light RTM (though seldom used) at the first ends of the flow passages and/or by arranging vacuum to the opposite ends of the flow passages.

The thin discrete flow passage forming means 6 used between the reinforcement layers 2 and 4 for improving both the permeability of the stack of reinforcements to resin in transverse direction and air removal from between the stack of reinforcement layers create small flow passages 10 on both of their sides and between the reinforcing unidirectional rovings as shown schematically in FIG. 1a. The thin discrete flow passage forming means are preferably formed of polyamide (PA), co-polyamide or copolyester (co-PET) monofilaments that may have, for instance, a round, square or oval cross section or an X- or hollow cross section. Thin discrete flow passage forming means may also be bicomponent or multicomponent ones. In other words, as the thin discrete flow passage forming means are manufactured from a suitable polymeric material by, for instance, extrusion, the cross section of the thin discrete flow passage forming means may be, in practice, chosen freely for optimizing the resin flow properties. In view of the present invention it is advantageous to use such a thin discrete flow passage forming means cross section that creates maximal geometrical cross section or maximize the distance between the reinforcing rovings in two overlapping layers with given volume, while keeping the amount of non-reinforcing material (the monofilament polymer) in minimum.

The means for creating flow passages for resin is normally a single filament having the diameter or Z-direction thickness of the order of 70-300 µm, preferably of 100-200 µm, more preferably between 130-170 µm. However, the flow passage creating means of the present invention have several other options. The flow passage creating means may be formed of a bundle of monofilaments, i.e. for instance 3 filaments, possibly 5 or more filaments (see FIGS. 3a-3d) arranged in communication with each other such that a desired gap having a Z-direction dimension is left between the reinforcements when they are placed one on top of another.

One option is to use a bundle of a few monofilaments that may be twisted loosely together such that the bundle flattens under compression. In such a case the thickness of the final bundle after compression corresponds to the diameter of each monofilament, whereby the diameter of each monofilament is, preferably, of the order of 70-300 µm, preferably of 100-200 µm, more preferably between 130-170 µm.

Figure 3B:
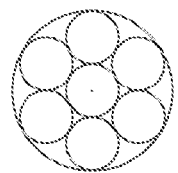
Figure 3C:
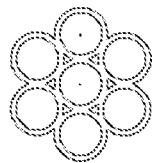
Figure 3D:
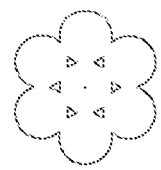

Another option is to arrange a number of monofilaments in communication with one another such that the cross section of the bundle remains substantially the same under compression. In practice it means that the monofilaments have to be, in accordance with an additional preferred embodiment of the present invention, fastened to each other, as illustrated in FIGS. 3a-3d, whereby a more compact flow passage creating means are formed and the aspect ratio (width-height ratio) of the bundle of monofilaments is easily below 2.0. The monofilaments of the bundle may be during their application phase either heat-treated or sprayed by a liquid binder so that the monofilaments attach to each other as shown in FIG. 3a, and, thus, are not able to move under compression. The bundle of monofilaments may also be embedded in an appropriate coating material as shown in FIG. 3b, or the monofilaments of a bundle may be bi-component monofilaments coated with a specific binder as shown in FIG. 3c. In all above cases it is advantageous if the binder used in bonding the monofilaments is compatible with the resin matrix of the future laminate. Another prerequisite for the binder material is that the resulting bonded flow passage forming means is as flexible as possible in order to prevent the formation of kinks in the laminate. Also, the monofilaments may be fused to one another as shown in FIG. 3d. When using such bonded thin discrete flow passage forming means, the diameter, or actually the Z-direction dimension, of the forming means is of the order of 70-300 µm, preferably of 100-200 µm, more preferably between 130-170 µm. The actual Z-direction dimension of the forming means depends on the permeability of the actual reinforcing fibers and the diameter of the fibers.

Thus, to ensure that the flow passages formed by the various thin discrete flow passage forming means are as efficient as possible in relation to the amount of foreign matter brought on the reinforcement by the thin discrete flow passage forming means, the bundle of monofilaments should be as compact as possible, which means that its aspect ratio (width/height-ratio) should be equal or less than 2.0, preferably less than 1.5, most preferably as close to 1.0 as possible, when the thin discrete flow passage forming means is subjected to vacuum, i.e. compression in the wet-out or impregnation stage. Aspect ratio 2 means, for instance, two monofilaments arranged side by side.

Irrespective of the diameter or detailed cross section or other structure of the transverse thin discrete flow passage forming means, it is clear that the thin discrete flow passage forming means does not, in accordance with the present invention, give any particular transverse stability to the reinforcement, but the stability is solely ensured by the use of stitches of warp knitting technology or conventional multifilament yarns or random oriented yarns in the form of web.

As to the shape and size of the thin discrete flow passage forming means as well as their positioning on the reinforcement layers, i.e. their lateral distance from each other, all these features (among others) have to be considered carefully in view of proper impregnation and wet-out of the reinforcement stack with resin. The resin flow passages formed to the sides of the thin discrete flow passage forming means shall not be too open so that the resin has time to impregnate into the rovings and not to flow directly from the side of the stack of reinforcement where the resin is introduced to the opposite side of the reinforcement stack. Naturally, the shorter the distance is between adjacent thin discrete flow passage forming means, the more open, i.e. larger cross-section, the transverse flow passages at the sides of the thin discrete flow passage forming means may be, and vice versa. Another thing that has to be taken into account is the thickness or gram weight of the reinforcement layer. The thicker the reinforcement layer is the more time it takes to properly wet-out the layer with resin. With the present invention it is possible to adjust the permeability of the reinforcement to make sure that the individual reinforcing fibers will be well impregnated and no dry areas or voids are left between the fibers. However, irrespective of the diameter or detailed cross section or other structure of the thin discrete transverse flow passage forming means, the thin discrete flow passage forming means does not give any substantial transverse stability to the reinforcement, but in the case of a unidirectional or multi-axial reinforcement the stability is solely ensured by the use of stitches.

In accordance with a further preferred embodiment of the present invention an ideal property for polymer material for the thin discrete flow passage forming means is that the material does not retard the curing or otherwise has no negative effect on the chemical, thermal or the mechanical properties of the resin, which forms the matrix. In the performed experiments thin discrete flow passage forming means of polyamide (PA), co-polyamide or co-PET have been used. However, other materials that function in a desired manner may also be used.

Another preferred optional property for polymer material for the thin discrete flow passage forming means is that the material is, at least partially, soluble to the resin. However, the solubility should be so weak or slow that the reinforcement has time to be impregnated by resin before the thin discrete flow passage forming means "disappear" or "collapse". However, the advantage of the at least partially soluble thin discrete flow passage forming means is that the channels formed by the thin discrete flow passage forming means vanish/disappear, and the product gets even more homogenous than when using non-soluble very thin discrete flow passage forming means. As an example of above discussed variants, a bicomponent thin discrete flow passage forming means structure comprising a monofilament or a bundle of monofilaments, provided with an outer layer of polymer material with differing properties may be mentioned, the outer layer being soluble to the matrix material. The solubility of the outer layer is preferably chosen such that it dissolves to the resin after the resin has impregnated the stack of reinforcements. The advantage of this thin discrete flow passage forming means structure is that the core part of the thin discrete flow passage forming means itself may have a diameter of 70 μm, and the outer layer thickness of 50 μm. Thereby the diameter of the bicomponent thin discrete flow passage forming means is during the impregnation 170 μm, and after the dissolution of the outer layer only 70 μm whereby the rovings in the final product get closer to each other. This minimizes even further the risk of premature laminate failure to virtually zero at the junctions between thin discrete flow passage forming means and the rovings.

The prior art has already taught, when, for instance, using for binding unidirectional reinforcement rovings to one another, transverse hot-melt coated glass fiber yarns that the transverse filaments of the glass fiber yarn may break under transverse loading of the laminate and create small micro cracks as a result. Micro cracks may have adverse effects on the static and dynamic properties of the laminate, as they might serve as initiators for bigger cracks leading to visible damages in laminate structure and finally escalate to total part damage. Naturally the same risk applies to thin discrete flow passage forming means, too.

Thus the elongation at break of the thin discrete flow passage forming means should be at least the same as that of the matrix. For instance, the elongation at break of an epoxy matrix is about 6%, whereby the elongation at break of the thin discrete flow passage forming means should be more than 6%, preferably about 10%, more preferably about 20%. The exact value depends mainly on the resin type used. Another way of defining and comparing the material properties of the matrix and the thin discrete flow passage forming means is to evaluate their moduli of elasticity. In other words, in order to work properly and reliably in all applications the modulus of elasticity of the thin discrete flow passage forming means should be lower, preferably clearly lower than that of the matrix material. Since the modulus of elasticity of the matrix material like epoxy polyester or vinyl ester is about 3 GPa, the modulus of elasticity of the thin discrete flow passage forming means should preferably be of the order of 2 GPa, or less.

Another thing that has to be understood is that the above discussed use of transverse thin discrete flow passage forming means for creating uniform transverse flow passages for resin used for impregnating a stack of reinforcements in a mold may not only be applied in connection with stitched unidirectional or multi-axial reinforcements, but also in connection with all kinds of reinforcements including but not limited to multi-axial or woven reinforcements, etc. For instance in woven reinforcements the thin discrete flow passage forming means may be utilized as the weft yarns, whereby they, when travelling between the top and bottom surfaces of the reinforcement, act not only as flow passages in a direction transverse to the UD-reinforcement rovings but also in Z-direction. In this case the thin discrete flow passage forming means are preferably, but not necessarily arranged as bundles of up to about 5 filaments, as the weft yarns should give the reinforcement its handling stability. Thin discrete flow passage forming means may also be applied by conventional or modified carriages used in multi-axial machines or weft insertion systems in weaving.

The above mentioned application of the stitched unidirectional or multi-axial reinforcement in the manufacture of spar cap laminates for wind turbine blades is just one of the innumerous applications where this kind of reinforcements are applied. The reinforcement of the present invention finds best use where there is a need for stitched unidirectionally or multi-axially oriented reinforcement with high mechanical properties, especially fatigue but also static properties. However, it should be understood that the stitched unidirectional or multi-axial reinforcement of the invention may be used in any application where fibre reinforced matrices are used.

Figure 4:
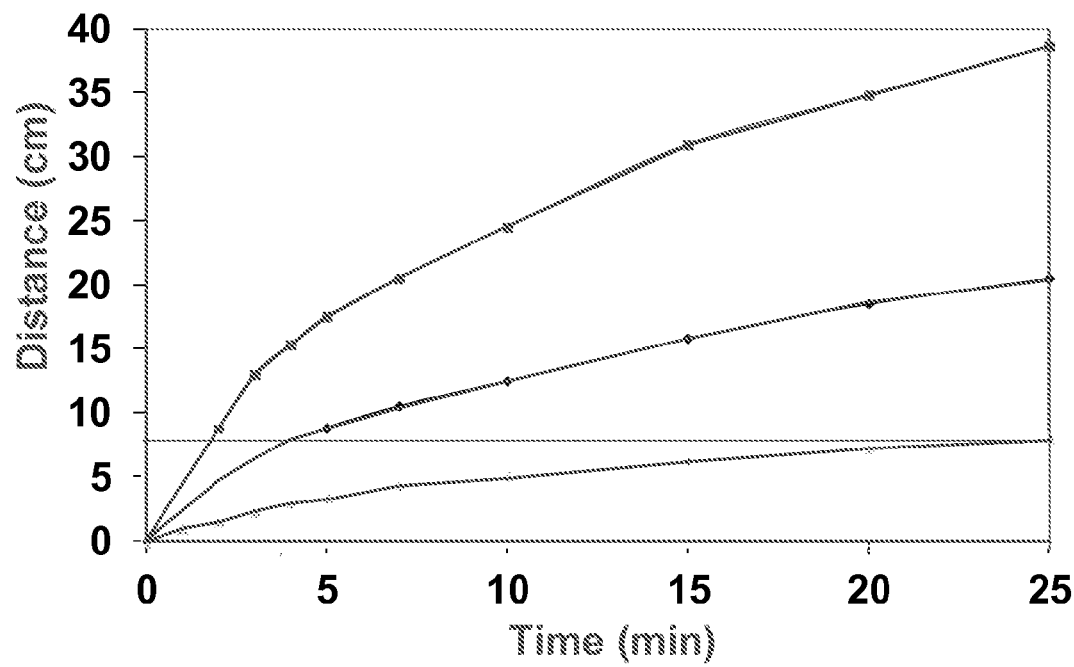

FIG. 4 is an illustration comparing the resin flow properties of a prior art reinforcement with those of the unidirectional or multi-axial reinforcement of the present invention having two different settings of thin discrete flow passage forming means. The experiment was performed such that three different reinforcements were prepared. In the manufacture of all reinforcements the same unidirectional rovings, the same stitching yarn and the same kind and type of stitch were used. The only difference was in the transverse fibers that were arranged by weft yarn carriages typical for multi-axial machines and then stitched. In the manufacture of a reference prior art reinforcement a multi-filament yarn (68 tex, 400 filaments, each having a diameter of 16 μm) was arranged at 10 mm spacing and at angles of +45 and −45 degrees to the direction of the unidirectional rovings. In the first reinforcement in accordance with the present invention thin discrete flow passage forming means in the form of (CoPET—polyethylene terephthalate copolymer) monofilaments having a diameter of 170 μm were arranged at right angles to the unidirectional rovings, the thin discrete flow passage forming means, i.e. the monofilaments, being placed with 10 mm spacing. In the second reinforcement in accordance with the present invention the same monofilaments as in the first reinforcement of the invention were arranged at right angles to the unidirectional rovings, the monofilaments being placed with 3 mm spacing.

For the experiment two equally dimensioned sheets of reinforcement was cut from each reinforcement. In each experiment the two similar sheets were placed in test mold comprising glass sheet underside such that plastic film covered the reinforcements. The package was made airtight with usual sealing mass. Thereafter the mold was subjected to vacuum of −0.95 bar for air removal for 10 minutes, whereafter epoxy resin having a viscosity of 300 mPas was introduced crosswise to reinforcing rovings into the mold at a room temperature of 23° C. A chart was drafted by recording the wet-out distance the resin has advanced as a function of time.

FIG. 4 illustrates the wet-out distance the resin has flown as a function of time. The lowermost graph shows the resin flow speed in the prior art reinforcement. It takes 25 minutes for the resin to advance 8 cm. The flow front position typically follows the well known Darcy's law where the position is inversely proportional to square root of time. Thus there is a certain maximal value, which may be infinitely approached but never reached. Difference in permeability determines the actual distance of flow front, i.e. the wet-out distance, if other parameters like viscosity and temperature are kept constant. Since the lowermost (prior art) graph is almost horizontal at 25 minutes, it is expected that even a considerable increase in the impregnation time would not increase the impregnation distance much. The graph in the middle shows the resin flow speed in a reinforcement where the transverse thin discrete flow passage forming means were 10 mm apart from one another. For advancing 8 cm, the resin needed 4 minutes 5 second. In other words, the resin flow speed was about 6-fold compared to the reference reinforcement, and an impregnation/wet-out distance of 20 cm was reached in 25 minutes. By increasing the wet-out time the wet-out distance would still increase by a few cm's. The uppermost graph shows the resin flow speed in a reinforcement where the transverse thin discrete flow passage forming means were 3 mm apart from one another. Here it took 1 minute 50 second for the resin to flow 8 cm, i.e. the resin flow speed was 13.6-fold compared to the reference reinforcement and an impregnation distance of about 38 cm was reached in 25 minutes. By increasing the wet-out time the distance might still increase by about ten cm's. In other words, the performed experiments suggest that, if short impregnation distance is needed, the use of the thin discrete flow passage forming means in accordance with the present invention reduce the impregnation time to about one tenth of the time needed by prior art reinforcements, or if long impregnation distance is needed the use of the thin discrete flow passage forming means in accordance with the present invention increase the distance to about 6-fold compared to prior art reinforcements.

The above experiments show clearly the huge advantage the novel design of transverse flow passages formed by the use of thin discrete flow passage forming means bring. And as discussed already above it is not only a question of "high-speed" infusion that increases the production speed significantly, but also a question of very efficient gas removal from the stack of reinforcements ensuring void-free laminate without dry or semi-impregnated areas, and a question of a laminate that has better strength and fatigue properties than prior art laminates used for the same purposes.

The reinforcement of the present invention may be used with all kinds of infusion methods, including but not limited to vacuum infusion, Light RTM or RTM methods. Other lamination cases where resin impregnation is critical or otherwise retarded by tightly arranged fibers or other material present in the laminate structure like sandwich materials, fire retarding materials, fillers, pigments etc., where resin viscosity may be extremely high, may be improved by means of the reinforcement of the present invention.

The reinforcements of the present invention may be used in both manufacture of preforms or end products, i.e. laminates like for instance wind turbine blades. The preforms may be manufactured of at least two reinforcements by laying the reinforcements one on top of another such that the thin discrete flow passage forming means of a first reinforcement face the second reinforcement located below or above the first reinforcement and by using appropriate binder, if needed (sometimes mere heating of the reinforcement/s and the binder applied earlier to bond the rovings is sufficient), for bonding the reinforcements together for forming the preform. The unidirectional reinforcements may be positioned one on top of another either such that the rovings of all reinforcements are parallel or such that the rovings of a first reinforcement are arranged at an angle to the rovings of a second reinforcement, whereby a multi-axial preform is formed.

In a similar manner a laminate may be manufactured of the reinforcement of the invention or of the above discussed preform. In the method of manufacturing the laminate at least two reinforcements, or preforms, are laid one on top of another in the mold such that the thin discrete flow passage forming means of a first reinforcement face the second reinforcement located above the first reinforcement, a cover is positioned on the reinforcements, the mold is closed, and a pressure difference is provided for evacuating air from the mold and for impregnating the reinforcement/s with resin.

Another option is to use only one unidirectional reinforcement in the mold such that the thin discrete flow passage forming means are facing both the bottom and the cover of the mold.

It is clear that the invention is not limited to the examples mentioned above but can be implemented in many other different embodiments within the scope of the inventive idea. It is also clear that the features in each embodiment described above may be used in connection with the other embodiments whenever feasible.

The invention claimed is:

1. A stitched unidirectional or multi-axial reinforcement for the manufacture of fiber reinforced composites by one of resin transfer molding process and vacuum infusion molding process, the stitched unidirectional or multi-axial reinforcement comprising:
   at least one layer of continuous unidirectional rovings arranged in the reinforcement, and
   a resin flow facilitator which, when wetting-out a stack of reinforcements with resin, facilitates a flow of resin in a direction transverse to a direction of the unidirectional rovings,
   wherein the resin flow facilitator includes a single monofilament or a bundle of monofilaments bonded to one another having, under compression, a diameter or a thickness of 70 μm to 300 μm, the thickness is measured in a direction perpendicular to a plane of the at least one layer, the single monofilament or the bundle of monofilaments being arranged transverse to the unidirectional rovings, and the single monofilament or the bundle of monofilaments extending from one edge of the stitched unidirectional or multi-axial reinforcement to an opposite edge of the reinforcement, the at least one layer being bonded by stitching to the single monofilament or the bundle of monofilaments, wherein the single monofilament or the bundle of monofilaments while in position with the unidirectional rovings form at least one flow passage in the reinforcement extending from the one edge to the opposite edge of the reinforcement.

2. The stitched unidirectional or multi-axial reinforcement as recited in claim 1, wherein the single monofilament or the bundle of monofilaments are arranged at right angles to the direction of the unidirectional rovings or their direction deviates at most 45 degrees therefrom.

3. The stitched unidirectional or multi-axial reinforcement as recited in claim 1, wherein the reinforcement is formed of two or more layers of roving s and the single monofilament or the bundle of monofilaments are arranged between at least two layers of rovings, or the single monofilament or the bundle of monofilaments are arranged only on a top and/or bottom surfaces of the unidirectional or multi-axial reinforcement.

4. The stitched unidirectional or multi-axial reinforcement as recited in claim 1, wherein the single monofilament or the bundle of monofilaments are arranged on at least one of a top surface and a bottom surface of the unidirectional or multi-axial reinforcement.

5. The stitched unidirectional or multi-axial reinforcement as recited in claim 1, wherein the single monofilament or the bundle of monofilaments are arranged at a spacing of 2 mm to 50 mm on the unidirectional or multi-axial reinforcement.

6. The stitched unidirectional or multi-axial reinforcement as recited in claim 1 wherein the single monofilament or the bundle of monofilaments has a diameter of 100 µm to 200 µm.

7. The stitched unidirectional or multi-axial reinforcement as recited in claim 1, wherein each stitch has a length, and a distance or spacing between adjacent or neighboring single monofilament or the bundle of monofilaments is longer than the stitch length.

8. The stitched unidirectional or multi-axial reinforcement as recited in claim 1, wherein the single monofilament or the bundle of monofilaments have an elongation at break greater than an elongation at break of a matrix surrounding the layer and the single monofilament or the bundle of monofilaments.

9. The stitched unidirectional or multi-axial reinforcement as recited in claim 1 wherein the rovings are fibers formed of at least one of glass, carbon, aramid, basalt, flax, hemp, jute, and linen.

10. The stitched unidirectional or multi-axial reinforcement as recited claim 1, wherein the single monofilament or the bundle of monofilaments have, under compression, an aspect ratio of less than or equal to two.

11. The stitched unidirectional or multi-axial reinforcement as recited in claim 1 wherein the single monofilament or the bundle of monofilaments are made of at least one of polyamide (nylon), polyethylene terephthalate, polypropylene, polybutylene terephthalate, co-polyamide and copolyester (co-PET).

12. A preform comprising at least two stitched reinforcements as in claim 1.

13. A laminate comprising one or more stitched reinforcements as in claim 1.

14. A stitched unidirectional or multi-axial reinforcement comprising:

layers of continuous, unidirectional rovings aligned with a length direction of the reinforcement, and a single monofilament or a bundle of monofilaments bonded together having, under compression, a diameter or a thickness of 70 µm to 300 µm, the thickness is measured in a direction perpendicular to a plane of the layers, the single monofilament or the bundle of monofilaments is transverse to the unidirectional rovings, and the single monofilament or the bundle of monofilaments extend from one edge of the reinforcement to an opposite edge of the reinforcement, wherein the layers are stitched to the single monofilament or the bundle of monofilaments, and flow passages formed at a side of the single monofilament or the bundle of monofilaments and located between the layers of rovings, wherein the flow passages extend from the one edge to the opposite edge of the reinforcement.

15. The stitched unidirectional or multi-axial reinforcement of claim 14 wherein the reinforcement has a length greater than a width, wherein the width spans the one edge to the opposite edge.

16. The stitched unidirectional or multi-axial reinforcement of claim 14, wherein the single monofilament or the bundle of monofilaments is at an angle in a range of 45 degrees to 135 degrees to the length direction.

17. The stitched unidirectional or multi-axial reinforcement of claim 14 wherein the single monofilament or the bundle of monofilaments is repeated at intervals along the length of the reinforcement.

18. The stitched unidirectional or multi-axial reinforcement of claim 17 wherein the intervals are in a range of 2 mm to 50 mm.

19. The stitched unidirectional or multi-axial reinforcement of claim 14 wherein the layers is a plurality of the layers and the single monofilament or the bundle of monofilaments is sandwiched between two of the layers.

20. The stitched unidirectional or multi-axial reinforcement of claim 14 wherein the layers is a plurality of the layers and the single monofilament or the bundle of monofilaments is on a top surface of a top one of the layers or on a bottom surface of a bottom one of the layers.

21. The stitched unidirectional or multi-axial reinforcement of claim 14 wherein the single monofilament or the bundle of monofilaments have a diameter of 100 µm to 200 µm.

22. The stitched unidirectional or multi-axial reinforcement of claim 14 wherein the stitching of the layer to the single monofilament or the bundle of monofilaments includes stitches, each of which has a length shorter than an interval between an adjacent one of the single monofilament or the bundle of monofilaments.

23. The stitched unidirectional or multi-axial reinforcement of claim 14, wherein the single monofilament or the bundle of monofilaments has an elongation at break greater than an elongation at break of a matrix surrounding the layer and the single monofilament or the bundle of monofilaments.

24. The stitched unidirectional or multi-axial reinforcement of claim 14, wherein the rovings are fibers formed of at least one of glass, carbon, aramid, basalt, flax, hemp, jute, and linen.

25. The stitched unidirectional or multi-axial reinforcement of claim 14, wherein the single monofilament or the bundle of monofilaments has, under compression, an aspect ratio of less than or equal to two.

26. The stitched unidirectional or multi-axial reinforcement of claim 14, wherein the single monofilament or the bundle of monofilaments is formed of at least one of polyamide (nylon), polyethylene terephthalate, polypropylene, polybutylene terephthalate, co-polyamide and copolyester (co-PET).

* * * * *